(12) United States Patent
Jia et al.

(10) Patent No.: US 12,054,395 B2
(45) Date of Patent: Aug. 6, 2024

(54) REDUCED GRAPHENE OXIDE ELECTRODES AND SUPERCAPACITORS

(71) Applicant: Royal Melbourne Institute of Technology, Melbourne (AU)

(72) Inventors: Baohua Jia, Hawthorn (AU); Han Lin, Hawthorn (AU)

(73) Assignee: Royal Melbourne Institute of Technology, Melbourne (AU)

( * ) Notice: Subject to any disclaimer, the term of this patent is extended or adjusted under 35 U.S.C. 154(b) by 110 days.

(21) Appl. No.: 17/433,438

(22) PCT Filed: Feb. 24, 2020

(86) PCT No.: PCT/AU2020/050160
§ 371 (c)(1),
(2) Date: Aug. 24, 2021

(87) PCT Pub. No.: WO2020/172702
PCT Pub. Date: Sep. 3, 2020

(65) Prior Publication Data
US 2022/0144645 A1    May 12, 2022

(30) Foreign Application Priority Data

Feb. 25, 2019 (AU) ................. 2019900598

(51) Int. Cl.
*C01B 32/198*    (2017.01)
*C01B 32/194*    (2017.01)
(Continued)

(52) U.S. Cl.
CPC .......... *C01B 32/198* (2017.08); *C01B 32/194* (2017.08); *H01G 11/38* (2013.01); *H01G 11/86* (2013.01); *H01M 4/133* (2013.01); *H01M 4/1393* (2013.01); *C01B 2204/04* (2013.01); *C01B 2204/22* (2013.01); *C01P 2002/82* (2013.01); *C01P 2002/84* (2013.01); *C01P 2002/85* (2013.01); *C01P 2004/03* (2013.01); *H01M 2004/021* (2013.01)

(58) Field of Classification Search
None
See application file for complete search history.

(56) References Cited

U.S. PATENT DOCUMENTS 9,099,376 B1    8/2015    Yung et al.
2014/0050910 A1    2/2014    Mukherjee et al.
(Continued)

FOREIGN PATENT DOCUMENTS

CN    108622880 A    10/2018
EP    3 016 178 A1    5/2016
(Continued)

OTHER PUBLICATIONS

Australian Examination Report dated Jul. 13, 2021 in connection with Australian Application No. 2017320331.
(Continued)

*Primary Examiner* — Dion R. Ferguson
(74) *Attorney, Agent, or Firm* — Wolf, Greenfield & Sacks, P.C.

(57) ABSTRACT

A composition comprising reduced graphene oxide in the form of sheets that are interconnected to define pores between the sheets.

20 Claims, 3 Drawing Sheets

(51) Int. Cl.
| | |
|---|---|
| *H01G 11/38* | (2013.01) |
| *H01G 11/86* | (2013.01) |
| *H01M 4/133* | (2010.01) |
| *H01M 4/1393* | (2010.01) |
| *H01M 4/02* | (2006.01) |

(56) References Cited

U.S. PATENT DOCUMENTS

| | | | |
|---|---|---|---|
| 2015/0218003 A1 | 8/2015 | Zhamu et al. | |
| 2015/0259212 A1* | 9/2015 | Li | B82Y 40/00 |
| | | | 428/221 |
| 2015/0284253 A1* | 10/2015 | Zhamu | C01B 32/182 |
| | | | 427/372.2 |
| 2016/0064726 A1 | 3/2016 | Ikenuma et al. | |
| 2016/0228846 A1* | 8/2016 | Chen | C01B 32/23 |
| 2016/0304351 A1* | 10/2016 | Zhamu | C01B 32/23 |
| 2017/0178824 A1* | 6/2017 | Kaner | C01B 32/198 |
| 2019/0224628 A1* | 7/2019 | Lin | B01D 67/0079 |
| 2019/0284403 A1* | 9/2019 | Kaner | C09D 5/24 |
| 2021/0065996 A1* | 3/2021 | Lin | H01G 11/32 |
| 2022/0144645 A1* | 5/2022 | Jia | C01B 32/198 |

FOREIGN PATENT DOCUMENTS

| | | |
|---|---|---|
| KR | 2013-0044778 A | 5/2013 |
| KR | 2018-0057360 A1 | 5/2018 |
| KR | 102365020 B1 * | 2/2022 |
| WO | WO 2018/039710 A1 | 3/2018 |

OTHER PUBLICATIONS

International Search Report and Written Opinion mailed Nov. 9, 2017 in connection with International Application No. PCT/AU2017/050916.

International Preliminary Report on Patentability mailed Mar. 5, 2019 in connection with International Application No. PCT/AU2017/050916.

International Search Report and Written Opinion mailed May 12, 2020 in connection with International Application No. PCT/AU2020/050160.

International Preliminary Report on Patentability mailed Sep. 2, 2021 in connection with International Application No. PCT/AU2020/050160.

Supplementary European Search Report dated Apr. 3, 2020 in connection with European Application No. 17844672.0.

Chua et al., Chemical reduction of graphene oxide: a synthetic chemistry viewpoint. Chem Soc Rev. Jan. 7, 2014;43(1):291-312. doi: 10.1039/c3cs60303b. Epub Oct. 11, 2013. PMID: 24121318.

Dikin et al., Preparation and characterization of graphene oxide paper. Nature. Jul. 26, 2007; 448:457-460.

El-Kady et al., Laser scribing of high-performance and flexible graphene-based electrochemical capacitors. Science. Mar. 16, 2012; 335:1326-1330.

Guo et al., Cyclodextrin functionalized graphene nanosheets with high supramolecular recognition capability: synthesis and host-guest inclusion for enhanced electrochemical performance. Acs Nano. Jul. 27, 2010; 4(7):4001-10.

Hummers et al., Preparation of Graphitic Oxide. Journal of the American Chemical Society. 1958; 80(6):1339.

Jo et al., Ultrathin Supercapacitor Electrode Based on Reduced Graphene Oxide Nanosheets Assembled with Photo-Cross-Linkable Polymer: Conversion of Electrochemical Kinetics in Ultrathin Films. Chemistry of Materials 27.23 (2015): 7982-7989. 8 pages.

Liu et al., Laser irradiated self-supporting and flexible 3-dimensional graphene-based film electrode with promising electrochemical properties. RSC Adv. (Royal society of Chemistry Advances). May 12, 2015; 5:47074-47079.

Ma et al., Nickel Cobalt Hydroxide @Reduced Graphene Oxide Hybrid Manolayers for High Performance Asymmetric Supercapacitors with Remarkable Cycling Stability. ACS applied materials & interfaces, 8.3 (2016): 1992-2000. 9 pages. Downloaded Mar. 23, 2022.

Marcano et al., Improved Synthesis of Graphene Oxide. ACS NANO. 2010; 4(8):4806-4814.

Moon et al., 2D Graphene Oxide Nanosheets as an Adhesive Over-Coating Layer for Flexible Transparent Conductive Electrodes. Scientific Reports. Jan. 23, 2013; 3:1112, 7 pages.

Samavati et al., Fractal capacitors. IEEE Journal of solid-state circuits. Dec. 1998; 33(12):2035-2041.

Teoh et al., Direct laser-enabled graphene oxide-Reduced graphene oxide layered structures with micropatterning. J. Appl. Phys. 2012;112:064309-1-064309-6.

Voiry et al., High-quality graphene via microwave reduction of solution-exfoliated graphene oxide. Science. Sep. 23, 2016;353(6306):1413-1416. doi: 10.1126/science.aah3398. Epub Sep. 1, 2016. PMID: 27708034.

Zhou et al., Microstructuring of Graphene Oxide Nanosheets Using Direct Laser Writing. Advanced Materials 21.1 (2009): 67-71. 5 pages.

Office Action for U.S. Appl. No. 17/959,625 dated Feb. 3, 2023 and claims pending as of Feb. 3, 2023.

Office Action for U.S. Appl. No. 17/959,625 dated Aug. 29, 2023 and claims pending as of Aug. 29, 2023.

Chang et al., Reduced Graphene Oxide/Amaranth Extract/AuNPs Composite Hydrogel on Tumor Cells as Integrated Platform for Localized and Multiple Synergistic Therapy. ACS Appl Mater Interfaces. Jun. 3, 2015;7(21):11246-56. doi: 10.1021/acsami.5b03907. Epub May 22, 2015.

Deng et al., Reverse osmosis desalination of chitosan cross-linked graphene oxide/titania hybrid lamellar membranes. Nanotechnology. Jul. 8, 2016;27(27):274002. doi: 10.1088/0957-4484/27/27/274002. Epub May 27, 2016.

Kotov et al., Ultrathin graphite oxide-polyelectrolyte composites prepared by self-assembly: Transition between conductive and non-conductive states. Adv Mater. Aug. 1996;8(8):637-41.

* cited by examiner

REDUCED GRAPHENE OXIDE ELECTRODES AND SUPERCAPACITORS

CROSS-REFERENCE TO RELATED APPLICATIONS

This application is a 371 of International Application No. PCT/AU2020/050160, filed Feb. 24, 2020, which claims priority to Australian patent application 2019900598 (filed Feb. 25, 2019), each of which is hereby incorporated by reference in its entirety.

FIELD OF INVENTION

The invention relates to a process of producing graphene-based electrodes that may be used in supercapacitors. The invention also relates to a freestanding film of graphene oxide (GO) and a slurry comprising reduced graphene oxide (rGO).

BACKGROUND

Graphene is an allotrope of carbon. Recently, interest in graphene-based materials has increased due to its unique physical attributes, including strength, heat and electrical conductivity, and optical properties. In particular, graphene-based electrodes have attracted increased attention.

Currently, one way to make an electrode comprising a graphene-based material is to reduce GO by chemical, thermal and electrochemical methods. GO is a derivative of graphene that comprises oxygen containing functional groups (OCFGs). Reduction methods of GO were recently reviewed in Chua, C. K. and Pumera, M., *Chem Soc. Rev.* 2014:43; 291, which is incorporated entirely herein by reference.

Chemical reduction methods involve dispersing GO in water or creating a thin film of GO on a substrate and adding one or more reductants, such as hydrazine, sodium borohydride or ascorbic acid, amongst others.

Thermal reduction methods involve dispersing GO in water or creating a thin film of GO on a substrate and heating the suspension to above the reduction temperature of GO. The reduction temperature of GO has been reported as being about 200-230° C. or higher.

Electrochemical reduction typically involves suspending GO in water and applying a voltage across the suspension to electrodeposit rGO on one of the electrochemical electrodes.

Typically, GO is reduced as a suspension in water. In many cases, following reduction, the suspension is used directly to create an electrode. However, these suspensions comprise water as the carrier. The use of water limits the thickness as typically cracks form during the relatively harsh drying process, especially for thicker films (e.g. >20 μm). This limits the thickness of accessible films which also limits the volume and mass ratio of the electrode materials. The volume and mass ratios of the rGO are important for practical application of rGO materials in supercapacitors, as the thickness of the rGO layer effectively limits the overall volumetric energy density and specific energy of an electrode.

Accordingly, there is a need to develop alternative processes for reducing GO. There is also a need to develop alternative rGO materials possessing desirable electrical properties that are accessible by processes that allow their industrial application.

SUMMARY

In one aspect, the invention provides a composition comprising rGO in the form of sheets that are interconnected to define pores between the sheets.

In another aspect, the invention provides a freestanding film comprising GO and having a thickness of at least about 15 μm.

In a further aspect, the invention provides a composition comprising rGO produced by rapid reduction of a freestanding film comprising GO.

In another aspect, the invention provides a slurry comprising the rGO of the invention and a carrier.

In a further aspect, the invention provides an electrode comprising a layer of the rGO of the invention and a conductive substrate.

In another aspect, the invention provides a supercapacitor comprising an electrode of the invention.

In a further aspect, the invention provides a method of reducing GO, comprising rapidly heating a freestanding film comprising GO.

In another aspect, the invention provides a method of preparing an electrode, comprising:
  rapidly heating a freestanding film comprising GO to form a freestanding film comprising rGO;
  processing the freestanding film comprising rGO into a powder;
  dispersing the powder in a carrier to form a slurry;
  applying the slurry to a conductive substrate to form a wet layer; and
  removing carrier from the wet layer to form a dried layer.

In a further aspect, the invention provides a process of preparing a freestanding film comprising graphene oxide, the process comprising:
  mixing graphene oxide and water to form a suspension;
  coating the suspension on a substrate to form a layer comprising GO;
  drying the layer to substantially remove the carrier; and
  removing the layer from the substrate.

Before describing the present invention in detail, it is to be understood that this invention is not limited to particularly exemplified embodiments, such as the composites, sensing devices, diagnostic methods and methods of manufacture, which may, of course, vary. It is also to be understood that the terminology used herein is for the purpose of describing particular embodiments of the invention only and is not intended to be limiting.

All publications, patents and patent applications cited herein, whether supra or infra, are hereby incorporated by reference in their entirety. However, publications mentioned herein are cited for the purpose of describing and disclosing the protocols and reagents which are reported in the publications and which might be used in connection with the invention. Nothing herein is to be construed as an admission that the invention is not entitled to antedate such disclosure by virtue of prior invention.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It must be noted that as used herein and in the appended claims, the singular forms "a," "an," and "the" include plural reference unless the context clearly dictates otherwise. Thus, for example, a reference to "a layer" and/or "at least one layer" may include one or more layers, and so forth.

Unless defined otherwise, all technical and scientific terms used herein have the same meanings as commonly understood by one of ordinary skill in the art to which this invention belongs. Although any materials and methods similar or equivalent to those described herein can be used to practice or test the present invention, the preferred materials and methods are now described.

The term "(5)" following a noun contemplates the singular or plural form, or both. The term "and/or" can mean "and" or "or".

Unless the context requires otherwise, all percentages referred to herein are percentages by weight of the composite.

Unless the context requires otherwise, all amounts referred to herein are intended to be amounts by weight.

Various features of the invention are described with reference to a certain value, or range of values. These values are intended to relate to the results of the various appropriate measurement techniques, and therefore should be interpreted as including a margin of error inherent in any particular measurement technique. Some of the values referred to herein are denoted by the term "about" to at least in part account for this variability. The term "about", when used to describe a value, may mean an amount within ±25%, ±10%, ±5%, ±1% or ±0.1% of that value.

The term "comprising" is used in an inclusive sense, i.e. to specify the presence of the stated features but not to preclude the presence or addition of further features in various embodiments of the invention. When interpreting statements in this specification that include that term, the features, prefaced by that term in each statement, all need to be present but other features can also be present. Related terms such as "comprise" and "comprised" are to be interpreted in the same manner.

BRIEF DESCRIPTION OF DRAWINGS

The present invention will be further described, by way of example only, with reference to the accompanying drawings, in which.

DESCRIPTION OF EMBODIMENT(S)

The invention provides a composition comprising rGO in the form of sheets that are interconnected to define pores between the sheets.

Figure 1:
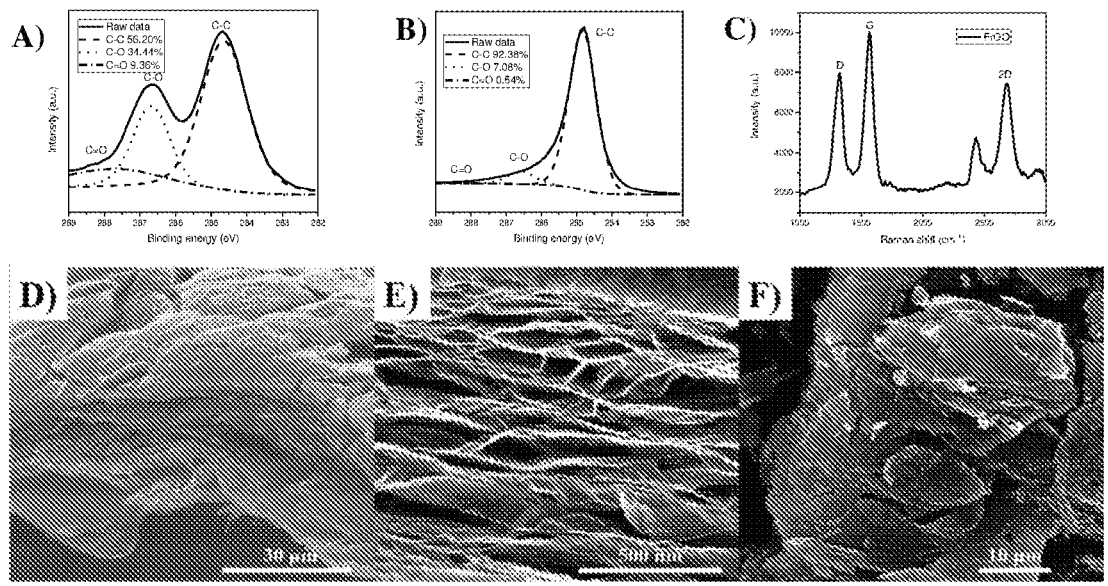
FIGS. 1A-F show (A) X-ray photoelectron spectroscopy (XPS) spectra of a GO film of Example 1; (B) XPS spectra of a flashlight reduced graphene oxide (frGO) film of Example 2; (C) Raman spectra for GO, frGO and microwave reduced graphene oxide (mrGO) samples; (D) an scanning electron microscopy (SEM) image of a cross-section of a freestanding frGO film of Example 2; (E) an SEM image of a cross-section of a freestanding frGO film shown in FIG. 1D at higher magnification; and (F) an SEM image of the top-view of the frGO film shown in FIGS. 1D and 1E.

The structure of this graphene-based material surprisingly provides a balance of desirable properties, including (i) porosity, (ii) 3-dimensional network characteristics and (iii) electrical conductivity. The rGO compositions possess a greater degree of porosity than those produced using previous techniques. Increased porosity provides the rGO compositions with greater specific surface area, which allows for greater ion counter-flow to balance electrons flowing through the graphene-based sheets. Further, increased specific surface area is believed to be important for using the rGO compositions in capacitors. The increased porosity may also allow ions of larger size to serve as electrolyte, such as some ionic liquids. The increased porosity may also enable thicker layers of graphene-based material to be manufactured. The increased porosity of the rGO compositions results in a relative greater number of defects in the graphene-based sheets. It is therefore surprising that a material comprising the increased porosity and these defects possesses comparable electrical conductivity to other rGO materials. In addition, the rGO compositions are more readily accessible than by previous techniques and advantageously comprise increased porosity. In addition, the rGO compositions are considered to possess 3-dimensional network characteristics as the compositions comprise multiple interconnected sheets, which provides different structural geometries compared with the relatively planar graphene mono-layer structure. The interconnected sheets and pores are best shown in FIG. 1E.

The rGO possesses high graphene-like character. The degree of graphene-like character can be assessed by XPS and integrating the area under the peak corresponding to C—C sp2 bonds to other peaks in the spectrum. In some embodiments, the minimum percentage of C—C sp2 bonds present in the rGO may be at least about 70%, 75%, 80%, 85%, 86%, 87%, 88%, 89%, 90%, 91% or 92%. The maximum percentage of C—C sp2 bonds present in the rGO may be up to about 99.9%, 99.8%, 99.5%, 99%, 98%, 97%, 96%, 95%, 94%, 93%, 92.5% or 92.4%. The percentage of C—C sp2 bonds in the rGO may be from any of these minimum amounts to any of these maximum amounts, for example, from about 70% to about 99.9% or about 90% to about 94%. In some embodiments, the rGO comprises defects resulting from loss of carbon atoms relative to a "perfect" graphene basal plane.

The sheets comprise the rGO. In some embodiments, the sheets consist of rGO. The sheets may be in the form of rGO flakes. A monolayer of graphene has a thickness of 0.34 nm.

Accordingly, the minimum average thickness of the sheets may be at least about 0.34 nm, 0.5 nm, 0.7 nm, 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm or 20 nm. The maximum average thickness of the sheets may be up to about 50 nm, 25 nm or 20 nm. The average thickness of the sheets may be from any of these minimum amounts to any of these maximum amounts, for example from about 0.34 nm to about 50 nm, about 1 nm to about 50 nm, or about 5 nm to about 25 nm.

The sheets form a network. The sheets of rGO are typically not uniformly aligned, meaning that not all of the sheets in the composition are stacked in the same orientation within the composition. Further, the sheets may possess different dimensions relative to other sheets in the composition. Typically, the sheets are substantially flat across their length and/or width, for example, the sheets are flat across 60%, 70%, 80%, 90% or 95% of their length and/or width. However, the sheets are typically not uniformly flat across their length and/or width. Some sheets may comprise curled end portions and/or cracks. These curled end portions and/or cracks may also define pores between the sheets. These pores may be referred to as "latitudinal pores" as they extend in a direction perpendicular to the largest face of a sheet.

The sheets of rGO are interconnected. The interconnections between the sheets define pores. These pores may be referred to herein as "longitudinal pores" as they extend in a direction parallel to the largest face of a sheet. The interconnections between the sheets may alternatively be referred to as bridges or walls. Typically, the interconnections are formed with the same material as for the sheets. The interconnections are therefore also typically conductive and provide electronic communication between the sheets.

The pores (latitudinal and/or longitudinal pores) may be non-uniform in size. In some embodiments, the size of the pores varies from the nanometer (nm) to the micrometer (μm) scale. For example, the size of the pores may vary from about 0.1 nm to about 2 μm. Pore size typically refers to the size of the longest dimension of an individual pore. However, typically, an average pore size is determined for all pores contained within a material. In some embodiments, the minimum average pore size may be at least about 0.1 nm, 0.5 nm, 1 nm, 2 nm, 3 nm, 4 nm, 5 nm, 6 nm, 7 nm, 8 nm, 9 nm, 10 nm, 11 nm or 12 nm. In some embodiments, the maximum average pore size may be not more than about 1000 nm, 900 nm, 800 nm, 700 nm, 600 nm, 500 nm, 400 nm, 300 nm, 200 nm, 100 nm, 75 nm, 50 nm, 25 nm, 20 nm, 15 nm or 12 nm. The average pore size may be from any of these minimum sizes to any of these maximum sizes, for example, from about 0.1 nm to about 1000 nm, about 5 nm to about 500 nm or about 10 nm to about 15 nm. Pore sizes may be measured by Brunauer-Emmett-Teller (BET) analysis or by visual inspection of SEM images.

The composition may be in the form of a film or powder.

The minimum electrical conductivity of the composition may be at least about 80 S m$^{-1}$, 90 S m$^{-1}$, 100 S m$^{-1}$, 110 S m$^{-1}$, 115 S m$^{-1}$, 120 S m$^{-1}$, 125 S m$^{-1}$, 130 S m$^{-1}$, or 135 S m$^{-1}$. The maximum electrical conductivity of the composition may be up to about 3000 S m$^{-1}$, 2500 S m$^{-1}$, 2000 S m$^{-1}$, 1500 S m$^{-1}$, 1000 S m$^{-1}$, 900 S m$^{-1}$, 800 S m$^{-1}$, 700 S m$^{-1}$, 600 S m$^{-1}$, 500 S m$^{-1}$, 400 S m$^{-1}$, 300 S m$^{-1}$, 250 S m$^{-1}$, 200 S m$^{-1}$, 150 S m$^{-1}$, 145 S m$^{-1}$, or 140 S m$^{-1}$. The electrical conductivity may be from any of these minimum amounts to any of these maximum amounts, for example, from about 80 S m$^{-1}$ to about 1000 S m$^{-1}$, about 100 S m$^{-1}$ to about 500 S m$^{-1}$, or about 100 S m$^{-1}$ to about 150 S m$^{-1}$.

The minimum electrical resistance of the composition may be at least about 100 Ωsq.$^{-1}$, 200 Ωsq.$^{-1}$, 300 Ωsq.$^{-1}$, 400 Ωsq.$^{-1}$, 500 Ωsq.$^{-1}$, 600 Ωsq.$^{-1}$, 650 Ωsq.$^{-1}$, or 700 Ωsq.$^{-1}$. The maximum electrical resistance of the composition may be up to about 2000 Ωsq.$^{-1}$, 1750 Ωsq.$^{-1}$, 1500 Ωsq.$^{-1}$, 1250 Ωsq.$^{-1}$, 1000 Ωsq.$^{-1}$, 900 Ωsq.$^{-1}$, 850 Ωsq.$^{-1}$, 800 Ωsq.$^{-1}$, or 750 Ωsq.$^{-1}$. The electrical resistance of the composition may be between any of these minimum amounts and any of these maximum amounts, for example, from about 100 Ωsq.$^{-1}$ to about 2000 Ωsq.$^{-1}$ or about 500 Ωsq.$^{-1}$ to about 1000 Ωsq.$^{-1}$. The electrical conductivity may be determined based on measured electrical resistance.

Freestanding GO Films

In one aspect, the invention also provides a freestanding film comprising GO. In particular, in some embodiments, the freestanding film has a thickness of at least about 15 μm.

The inventors have surprisingly found that rapid reduction of GO in a freestanding film directly provides a composition comprising porous rGO, such as the composition described above.

The film is a freestanding film. By "freestanding" it is meant that the film is not supported on a substrate. Lack of contact between the film and a substrate is important for its rapid heating, as contact with a substrate may lead to heat losses and failure to reach a peak temperature sufficient to reduce the GO.

In some embodiments, the freestanding film consists of GO.

In some embodiments, the film has a minimum thickness of at least about 10 μm, 15 μm, 20 μm, 25 μm or 30 μm. The maximum thickness of the film may be up to about 200 μm, 175 μm, 150 μm, 125 μm, 100 μm, 90 μm, 80 μm, 70 μm, 60 μm or 50 μm. The thickness of the film may be from any of these minimum amounts to any of these maximum amounts. As the freestanding films are intended to be used as precursors for rGO, it is desirable to provide thicker films than those that have been previously described for other purposes, such as filters. However, it will be appreciated that thin freestanding films may be reduced by the processes described herein.

Typically, the film lacks any visible bubbles, pores, cracks and/or solid particles.

In some embodiments, the film may be produced by a filtration process. The filtration process comprising filtering a suspension comprising GO and a carrier (such as water) through a filter. The filter may comprise pores with a size from about 30 nm to about 200 nm. Any suitable filter known in the art may be employed. In some embodiments, the filter is an aluminium oxide filter (e.g. an Anodisc™ filter) or a polymer membrane, such as a polyethersulfone (PES) membrane.

The filtration step may be assisted by vacuum suction or the suspension may be pushed through the filter using increased pressure.

Typically, the filtration step is used to prepare small-scale film, for example, films with a maximum thickness of up to about 10 μm, 9 μm or 8 μm. Typically, the small-scale films have a minimum thickness of at least about 0.05 μm, 1 μm, 2 μm, 3 μm, 4 μm or 5 μm. The thickness of the small-scale films may be from any of these minimum amounts to any of these maximum amounts, for example, from about 0.05 μm to about 10 μm.

In some embodiments, the freestanding film will have a surface area of at least about 0.7854 mm$^2$, 3.14 mm$^2$, 7.07 mm$^2$, 12.6 mm$^2$, 19.6 mm$^2$, 78.5 mm$^2$, 314 mm$^2$, 706 mm$^2$, 1.3×10$^3$ mm$^2$, 2.0×10$^3$ mm$^2$, 2.8×10$^3$ mm$^2$, 4.8×10$^3$ mm$^2$, 5.0×10$^3$ mm$^2$, 6.4×10$^3$ mm$^2$, or more. The surface area of the film may be between any of these areas, for example, from about 0.7854 mm² to about 6.4×10³ mm².

In some embodiments, the filter is circular. In these embodiments, the film may have a diameter of up to about 90 mm, 80 mm, 70 mm, 60 mm, 50 mm, 40 mm, 30 mm, 20 mm, 10 mm, 5 mm, 4 mm, 3 mm, 2 mm or 1 mm.

In some embodiments, the process further comprises a drying step. The drying step may comprise retaining the film on the filter and passing a gas through the wet film, either by maintaining suction or positive flow of gas used to drive the filtration step. In some embodiments, the drying step comprises heating the film and substrate optionally under reduced pressure. This temperature for this heating step will be to a temperature above the boiling point of the carrier.

To provide the freestanding GO film, the process further comprises removing the film from the filter. This may be achieved by peeling the film from the filter.

In some embodiments, the film is produced by a spreading method. The spreading method typically comprises:
  mixing GO and water to form a suspension;
  coating the suspension on a substrate to form a layer comprising GO;
  drying the layer to substantially remove the carrier; and
  removing the layer from the substrate.

The GO and water may be mixed by any means known in the art. For example, sufficient mixing can be achieved by vibration (e.g. using a VORTEX™ Mixer), agitation (e.g. using a magnetic stir bar and stirrer hotplate; an overhead stirrer or a shaker—orbital or reciprocating) or vacuum (e.g. using a vacuum mixer). Vacuum mixing is preferred to mix batches of greater volume (e.g. 700 ml or greater) of suspension.

Typically, mixing is maintained until the suspension appears uniform upon visual inspection, and no bubbles are visible. In some embodiments, mixing is maintained for about 15 minutes to about 45 minutes.

The minimum concentration of GO in the suspension may be at least about 1 mg/ml, 2.5 mg/ml, 5 mg/ml or 10 mg/ml. The maximum concentration of GO in the suspension may be up to about 100 mg/ml, 80 mg/ml, 60 mg/ml, 50 mg/ml, 40 mg/ml, 35 mg/ml, 30 mg/ml, 25 mg/ml, 20 mg/ml, or 15 mg/ml. The concentration of GO in the suspension may be from any of these minimum concentrations to any of these maximum concentrations, for example, from about 1 mg/ml to about 100 mg/ml or about 5 mg/ml to about 40 mg/ml. In some embodiments, the suspension is a slurry.

Once sufficiently mixed, the suspension is coated onto the substrate.

Any suitable substrate may be used. In some embodiments, the substrate comprises a non-stick material. Typically, the substrate is a Teflon substrate or Teflon coated substrate.

The suspension may be coated onto the substrate by any suitable means. In some embodiments, the coating step is carried out using a coating device. The coating device may be selected from a Dr Blade™ machine, a slot die, a roll-to-roll device such as a micro gravure or a spray-coating device.

The coated suspension may be referred to herein as a "wet film". The thickness of the wet film may be controlled by the coating device selected. Typically, the minimum thickness of the wet film may be at least about 100 μm, 500 μm, 1 mm, 2 mm, 3 mm, 4 mm or 5 mm. The maximum thickness of the wet film may be up to about 20 mm, 10 mm, 5 mm, 4 mm, 3 mm, 2 mm or 1 mm. The thickness of the wet film may be from any of these minimum values to any of these maximum values, for example, from about 1 mm to about 1 cm or about 2 mm to about 10 mm.

The wet film typically has a uniform thickness across the substrate. In some embodiments, the wet film is visibly smooth and flat across the entire coating area without any visible bubbles, pores, cracks and/or solid particles.

Following coating, the wet film is dried. Any suitable means of drying the wet film may be employed provided that the drying step removes water without damaging the structure of the GO film. In some embodiments, drying is achieved by placing the wet film and substrate in an oven. The oven may be a fan-assisted oven, a nitrogen purged oven or a vacuum oven. The oven may be set to a temperature below the boiling point of the carrier. In some embodiments, the temperature of the oven may be from about 40° C. to about 70° C.

The drying time will vary depending on the thickness of the wet film and the temperature of the oven. The drying step is typically maintained until no visible wet areas remain on the film. Typically, the drying time is from about 2 hours to about 5 hours.

The mass difference between the wet and dried films may vary depending on the concentration of GO in the suspension. In some embodiments, the mass difference between dried film and wet film may be up to about 5%, 4%, 3%, 2% or 1.5%. Typically, the mass difference will be about 1% to about 1.5%.

Once sufficiently dried, the dried film is removed from the substrate. In some embodiments, the film is removed by peeling it away from the substrate. Once removed from the substrate, the film is a freestanding film.

Process of Reducing GO

The invention also provides a process of reducing GO. The process comprises rapidly heating a freestanding film comprising GO. The film may be any of the films comprising freestanding GO described herein and may be prepared by any of the processes for preparing the freestanding GO described herein.

Reduction of freestanding GO by rapid heating surprisingly provides access to porous graphene-based materials in a single step. Porous graphene-based materials are desirable for use as conductive material in, for example, an electrode and devices such as supercapacitors.

The process comprises rapidly heating the freestanding film.

The reported minimum temperature for reduction of GO is 200° C. to 230° C. Accordingly, the rapid heating step may comprise applying a minimum peak temperature of at least about 250° C., 300° C., 350° C., 400° C., 500° C., 550° C., 600° C., 800° C., 1000° C., 1200° C., 1400° C., 1500° C., 1600° C., 1800° C., 1900° C. or 2000° C. The maximum peak temperature of the rapid heating step may be up to about 3000° C., 2900° C., 2800° C., 2700° C., 2600° C., 2500° C., 2400° C., 2300° C., 2200° C., 2100° C., 2000° C., 1800° C., 1600° C., 1500° C., 1400° C., 1200° C., 1000° C. or 800° C. The peak temperature may be from any of these minimum amounts to any of these maximum amounts provided that the minimum amount is below the maximum amount. For example, the peak temperature may be from about 250° C. to about 3000° C., about 600° C. to about 2500° C. or about 2000° C. to about 2500° C.

The rapid heating step requires that the peak temperature is reached in a short period of time. Typically, the minimum time required to reach the peak temperature is at least about 0.01 ms, 0.05 ms, 0.1 ms, 0.5 ms or 0.6 ms. The maximum time taken to reach the peak temperature may be up to about 10 ms, 9 ms, 8 ms, 7 ms, 6 ms, 5 ms, 4 ms, 3 ms, 2 ms, 1.5 ms or 1 ms.

To achieve the peak temperature within the short period of time, heat is typically applied as a pulse. The heat may be applied for a minimum time of at least about 0.1 ms, 0.5 ms, 1 ms, 2 ms, 3 ms, 4 ms or 5 ms. The heat may be applied for a maximum time of up to about 1 s, 90 ms, 80 ms, 70 ms, 60 ms, 50 ms, 40 ms, 30 ms, 20 ms, 10 ms, 5 ms or 1 ms. The heat may be applied for a time from any of these minimum times to any of these maximum times provided the minimum time is less than the maximum time. For example, the heat may be applied from about 0.01 ms to about 1 s, about 0.5 ms to about 10 ms or about 0.01 ms to about 1 ms. Any heat source capable of achieving the rapid heating required to reduce the freestanding GO may be used. The heat source may be selected from a flash light (e.g. a xenon flash bulb of a camera flash), a laser, a microwave emitter or a combination thereof. In some embodiments, the heat is provided in the form of photoirradiation, typically from a flash light. GO reduced by a flash light is referred to herein as "frGO". Accordingly, in some embodiments, the rGO included in the compositions, films, electrodes and devices of the invention is frGO.

Figure 3:
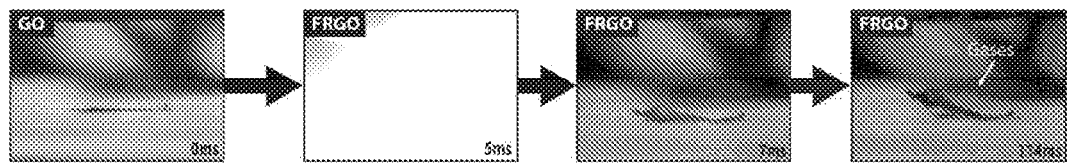
FIG. 3 shows a series of high-speed camera photos of the flash reduction process at 0ms, 5 ms, 7 ms and 114 ms after irradiation with a light pulse from a xenon globe.

The rapid heating causes reduction of GO in the freestanding film. The reduction comprises loss of oxygen containing functional groups (OCFGs) from the GO. The OCFGs are lost as oxygen-containing gas. This process is best shown in FIG. 3, where following exposure to the rapid heating step, the freestanding GO film changes in shape consistent with rapid gas evolution. It is believed that the evolution of these gases assists in the creation of pores within the rGO structure. As described above, porous graphene-based materials are advantageous for use as conductive materials as ions are able to flow through the pores.

In some embodiments, the process of reducing GO further comprises one or more of the following steps:
grinding the rGO to form a powder;
suspending the rGO in a carrier comprising an organic solvent to form a slurry;
applying the slurry to a substrate;
drying the coated substrate.

Any suitable grinder may be used in the grinding step. If the powder is too fine the porous structure of the rGO may be destroyed. Typically, the powder produced by this grinding step will have an average particle size large enough to retain the porous structure of the rGO.

The suspending step may comprise mixing the rGO with the carrier. Any suitable technique for forming the slurry may be employed, including any mixing steps described herein.

The slurry may be applied onto the substrate by any suitable technique, including any coating steps described herein. The substrate may be entirely coated with the slurry, or only a portion of the substrate may be coated.

The drying may be achieved by any suitable means known in the art, including any of the drying steps described herein.

The invention also provides a composition comprising rGO produced by this process. This composition may be any of the compositions comprising rGO described herein.

Slurry

In another aspect, the invention provides a slurry comprising rGO and a carrier comprising an organic solvent.

Providing the rGO in the form of a slurry advantageously assists in the manufacture of devices. The thickness of the layer of rGO may be increased when using the slurry compared to the thickness of rGO layers obtainable by methods known prior to completion of the invention. Existing methods of preparing layers of rGO typically require in situ reduction of GO in contact with a substrate or in the presence of carriers whose removal negatively impacts on the properties of the rGO.

The rGO may be any rGO described herein. Typically, the rGO suspended in the slurry is in the form of a powder.

The carrier comprises an organic solvent. Typically, the organic solvent selected is used in an amount to only sparingly dissolve the rGO. Suitable organic solvents include N-methyl pyrrolidone (NMP), dimethyl sulfoxide (DMSO), dimethylacetamide (DMA), N,N-dimethylformamide (DMF), acetonitrile (ACN), 2-methoxyethanol, pyridine, methanol, acetone, 1,4-dioxane, ethyl methyl ketone, ethyl acetate, chloroform, tetrahydrofuran, glyme, ethanol, propanol (including n-propanol and isopropanol), butanol (including n-butanol, s-butanol and t-butanol), 1,2-dichloroethane, dichloromethane, diethyl ether and combinations thereof. In some embodiments, the carrier consists of the organic solvent. In some embodiments, the organic solvent is NMP.

The minimum concentration of the rGO in the slurry may be at least about 20 mg/ml, 50 mg/ml, 75 mg/ml or 100 mg/ml. The maximum concentration of rGO in the slurry may be up to about 1000 mg/ml, 900 mg/ml, 800 mg/ml, 700 mg/ml, 600 mg/ml, 500 mg/ml, 400 mg/ml, 300 mg/ml or 200 mg/ml. The concentration of rGO in the slurry may be from any of these minimum amounts to any of these maximum amounts, for example, from about 20 mg/ml to about 1000 mg/ml or about 100 mg/ml to about 200 mg/ml.

In some embodiments, the slurry further comprises one or more additives. The additive may be selected from a further conductive material, a binder and combinations thereof.

A further conductive material may be included in the slurry to enhance the conductive properties of the rGO. Suitable further conductive materials include carbon (such as carbon powder). The further conductive material may be included in the slurry in a concentration from about 0.0001 mg/ml to about 0.1 mg/ml. The minimum ratio of rGO:further conductive material may be at least about 1:1, 2:1, 3:1, 4:1, 5:1, 6:1, 7:1 or 8:1. The maximum ratio of rGO:further conductive material may be up to about 100:1, 50:1, 20:1, 18:1, 16:1, 15:1, 14:1, 12:1, 10:1 or 8:1. The ratio of rGO:further conductive material may be from any of these minimum amounts to any of these maximum amounts, for example, from about 1:1 to about 100:1 or about 5:1 to about 16:1.

A binder may be added to the slurry. Any suitable binder may be selected that is capable of binding the rGO upon removal of the carrier. In some embodiments, the binder is a polymer binder, such as poly-1,1-difluoroethene (PVDF). The binder may be included in the slurry in a concentration from about 0.0001 mg/ml to about 0.1 mg/ml. The minimum ratio of rGO:binder may be at least about 1:1, 2:1, 3:1, 4:1, 5:1, 6:1, 7:1 or 8:1. The maximum ratio of rGO:binder may be up to about 100:1, 50:1, 20:1, 18:1, 16:1, 15:1, 14:1, 12:1, 10:1 or 8:1. The ratio of rGO:binder may be from any of these minimum amounts to any of these maximum amounts, for example, from about 1:1 to about 100:1 or about 5:1 to about 16:1.

The slurry advantageously assists in depositing a porous rGO material. Such materials are desirable for inclusion in a range of devices, such as electrodes. Accordingly, the invention also provides an electrode comprising a layer of a composition comprising the rGO of the invention and a conductive substrate.

The rGO is in electrical communication with the conductive substrate. Any suitable conductive substrate may be used, including metal substrates and other graphene-based substrates.

The layer of rGO may be relatively thicker than previously known rGO layers. In some embodiments, the thickness of the layer of rGO may be at least about 10 µm, 15 µm, 20 µm, 25 µm, 50 µm, 80 µm, 100 µm, 125 µm, 150 µm, 175 µm, 200 µm or more. The thickness of the layer of rGO may be between any of these values, for example, from about 10 µm to about 200 µm or 15 µm to about 175 µm.

However, even if the composition comprising rGO of the invention is deposited in a conventional thickness, the porous structure of this composition is desirable to include in an electrode due to its electrical conductivity and electrical resistance properties. In addition, the ability to deposit a graphene-based material using a slurry may enable large scale manufacture of graphene-based devices, using for example a roll-to-roll deposition process.

Accordingly, the invention also provides a device comprising an electrode of the invention. The device may be any device that would benefit from the properties of the rGO comprised in the electrode. The device may be a battery or a capacitor. In some embodiments, the device is a supercapacitor. Typically, a supercapacitor comprises two electrodes, a separator between the electrodes and two current collectors each in electrical communication with one of the two electrodes. The supercapacitor of the invention comprises at least one electrode comprising the rGO described herein. In some embodiments, the specific capacitance of the supercapacitor may be at least about 40 F/g, 50 F/g, 55 F/g, 60 F/g, 65 F/g, 66 F/g, 70 F/g, 75 F/g, 78 F/g, 80 F/g, 85 F/g, 90 F/g, 95 F/g, 100 F/g, 110 G/g, 120 F/g, 130 F/g, 140 F/g, 150 F/g or higher. These specific capacitances may be achieved at a scan rate of about 5 mV/s. In some embodiments, these specific capacitances may be achieved at scan rate of at least about 10 mV/s, 20 mV/s, 30 mV/s, 40 mV/s, 50 mV/s, 60 mV/s, 70 mV/s, 80 mV/s, 90 mV/s or 100 mV/s. The specific capacitance may vary depending on the scan rate. In some embodiments the specific capacitance of the supercapacitor may be from about 50 F/g to about 60 F/g at a scan rate of about 100 mV/s, about 65 F/g to about 75 F/g at a scan rate of about 50 mV/s, about 75 F/g to about 85 F/g at a scan rate of about 20 mV/s and about 60 F/g to about 150 F/g for a scan rate of about 5 mV/s.

Process of Preparing an Electrode

The invention also provides a process of preparing an electrode, comprising:
rapidly heating a freestanding film comprising GO to form a film comprising rGO;
processing the film comprising rGO into a powder;
dispersing the powder in a carrier comprising an organic solvent to form a slurry;
applying the slurry to a conductive substrate to form a wet layer; and
removing carrier from the wet layer to form a dried layer.

The rapid heating step of this process may be the same as the rapid heating step described herein for the process of reducing GO.

The processing step typically comprises grinding the film comprising rGO into a powder. Any suitable grinding process may be employed, including any grinding steps described herein. In some embodiments, the grinding step is carried out using a high energy ball-mill. The powder produced by this processing step may be any rGO-containing powder described herein.

Any means of dispersing the powder in the carrier may be employed. Typically, the powder is dispersed by mixing the powder and carrier together. Any of the mixing processes described herein may be employed.

The slurry used in this process may be any slurry comprising rGO described herein.

The conductive substrate may be any of the conductive substrates described herein for the electrodes.

The step of removing carrier from the wet layer may comprise complete removal of the carrier or may comprise substantial removal of carrier. Substantial removal may comprise removing at least about 60%, 70%, 80%, 90%, 95%, 98%, 99% or 99.9% of carrier from the wet layer.

The carrier may be removed by any suitable drying technique known in the art, including the drying steps described herein.

EXAMPLES

The invention will be further described by way of non-limiting example(s). It will be understood to persons skilled in the art of the invention that many modifications may be made without departing from the spirit and scope of the invention.

Example 1—Formation of Freestanding GO Film

The freestanding film comprising GO can be made by filtration, or using a device, such as a Dr. Blade machine or a slot die. Filtration is generally used for preparing small-scale films. In contrast, the Dr. Blade and slot die devices are generally used to produce relatively large-area films, although they can also be used to produce small-scale films.

Example 1.1—Filtration Method

The freestanding GO films of different thicknesses were prepared by a vacuum filtration technique employing an aluminium oxide (e.g. an Anodisc®) or polyethersulfone (PES) filter as the filter membrane (diameter can be in the range of 13 mm~90 mm and pore size can range from 30 nm to 200 nm). A suspension of GO is formed in water and passed through the filter membrane to form a GO film on the membrane. The concentration of GO in the solution can by up to about 10 mg/ml (e.g. from 0.1 mg/ml to 10 mg/ml). Thicknesses of the GO films were controlled by monitoring the mass of the GO suspension collected on the filter. The films are dried on the filter either by maintaining suction through the film and/or heating the film while in contact with the filter. After the films are completely dried, the films are peeled from the filter to provide the freestanding GO film.

Example 1.2—Non-Filtration Processes (Including Dr. Blade and Slot Die Methods)

Processes for forming a freestanding GO film not involving a filtration step include the following steps:
a. Mixing GO in a carrier (typically water) to form a slurry
b. Coating the slurry on a substrate to form a layer comprising GO
c. Drying the GO layer to substantially remove the carrier
d. Removing the layer from the substrate and optionally cutting the peeled layer into sections of desired size.

Mixing Step

GO slurry (current optimal value is 1±0.1%, 10±1 mg/ml, which can be varied from 5 mg/ml to 40 mg/ml according to the requirements of the machine) for standard freestanding GO film preparation needs to be properly mixed. There are three mixing methods that can be applied depending on the required volume of the slurry. For small volume (such as less than about 300 ml), vibration mixing or stir mixing are used. For large volume (such as from 700 ml up to several liters), vacuum mixing is used.

Vibration Mixing

The vibration mixing was completed using a VORTEX® Mixer for a time from about 15 mins to about 45 mins.

Stir Mixing

The stir mixing was completed using a magnetic stirrer (Labform Digital Magnetic Stirrer, 180×180 mm Plate at 300 rpm) for a time from about 15 mins to about 45 mins.

Vacuum Mixing

Large quantities of GO slurry were vacuum mixed through a vacuum mixer. Vacuum mixing was carried out for a time from about 15 mins to about 60 mins. One example of a vacuum mixer is Compact Dual-Shaft Planetary Vacuum Mixer with a 150 mL Container—MSK-SFM-16.

The criterion of the mixing step is that no visible microbubbles can be seen in the mixed GO slurry. If microbubbles are visible, the mixing step is repeated.

Coating Step

Following preparation of the mixed GO slurry, the GO slurry is coated onto a Teflon substrate. This coating step may be carried out using a "Dr Blade" machine or a slot die.

Coating Using a Dr. Blade Machine

A Teflon sheet in size of 12 cm*30 cm was placed onto the coating platform of the Dr. Blade machine and the vacuum pump was turned on. The coating step is accomplished with a Dr. Blade machine by pouring and spreading the GO slurry on the substrate. The Dr. Blade machine spreads the slurry across the substrate by passing a blade across the GO slurry with fixed gap between the blade and the substrate surface while retaining the substrate on the coating platform through vacuum suction. The film thickness can be calculated and tuned from the thickness of the blade gap (examples are shown in Table 1.)

The substrate is weighed prior to coating, and the weight of the coated layer can therefore be calculated based on the mass difference following each step. The pre-coating weight is referred to herein as $m_1$.

TABLE 1

The thickness of the blade gap versus dry film thickness

| Wet film thickness (Thickness of blade gap) | Dry film thickness |
|---|---|
| 3 ± 0.01 mm | 30 ± 0.1 μm |
| 4 ± 0.01 mm | 40 ± 0.1 μm |
| 5 ± 0.01 mm | 50 ± 0.1 μm |

The volume of GO slurry to coat a substrate is calculated based on Equation 1:

$$V(\text{mL}) = W(\text{cm}) \times L(\text{cm}) \times T(\text{cm}) \quad \text{Equation 1}$$

wherein V is slurry volume, W is substrate width, L is substrate length and T is film thickness (wet).

The appropriate volume of GO slurry was poured onto the substrate within the blade area. The coating speed was set to be 15 mm/sec using the speed node. After the blade has passed over the substrate the blade is reset and the vacuum pump turned off. The film was visibly smooth and flat across the entire coating area without any visible bubbles, pores, cracks or solid particles. If the film was not visibly smooth and flat across the entire coating area or any bubbles, pores, cracks or solid particles were visible, the film is discarded and the film forming process repeated.

Following coating, the coated substrate was weighed again. This weight is referred to herein as the wet weight—$m_2$. The mass of wet GO layer can then be calculated according to Equation 2:

$$m(\text{wet GO}) = m_2 - m_1 \quad \text{Equation 2}$$

Coating Using a Slot Die

Slot die coating technology was employed when the desired coating thickness is 1 micron wet up to 50 mm corresponding to the caliper thickness; the GO slurry has a viscosity from 1-100,000 cP. The slot die was operated up to 2000 fpm in line speed and the temperature of the process was controlled.

Drying Step

The drying process can be used for the film produced by any of the above coating methods. We describe below the drying step on the film coated using the Dr. Blade machine as an example.

The film was dried in a fan-assisted oven or a nitrogen purged oven. The oven temperature is set to about 40° C. to about 70° C., and the drying time adjusted depending on other parameters of the film, such as its thickness and the particular temperature within the range selected. The detailed technical requirements in the drying process are shown in Table 2.

TABLE 2

Drying parameters in GO film preparation

| Apparatus | Time | Temperature |
|---|---|---|
| Fan-assisted oven | 2 hours for 10 mg/ml slurry for film thickness from 10 μm to 50 μm | 70° C. |
| Fan-assisted oven | 5 hours for 10 mg/ml slurry for film thickness of 60 μm to 70 μm | 40° C. |
| Nitrogen purged oven ($N_2$ flowing rate: 25 L/min) | 3 hours for 10 mg/ml slurry for film thickness from 10 μm to 50 μm | 70° C. |

After drying, the GO film was fully dried without any visible wet area and contained no visible pores, cracks or solid particles. If wet areas remain, the film is returned to the oven for a second period of time. If pores, cracks or solid particles are visually observed, the dried film is discarded, or re-suspended in water and re-subjected to the filtration or non-filtration step(s).

After drying, the whole GO film on the Teflon substrate was weighed to provide the mass of dried film and Teflon sheet. This mass is referred to herein as $m_3$.

The mass of dry GO film is calculated according to Equation 3:

$$m(\text{dry GO film}) = m_3 - m_1 \quad \text{Equation 3}$$

Removing the GO Film from the Substrate and Optional Cutting Step

After drying, the GO film was peeled from the Teflon substrate manually under ambient conditions (for example, about 20-40° C.).

Then freestanding GO film was weighed to confirm the dry mass. If the dry mass (either directly determined at this stage or according to Equation 3) is more than about 1.5% of the wet mass ($m_1$) the film may not have been completely dried and the film should be resubjected to the drying step. Examples of wet and dry masses are shown in Table 3.

TABLE 3

Examples of drying percentage

| Film No. | Weight before Drying (g) | Weight after Drying (g) | Mass change (%) | Thickness before Drying (μm) | Thickness after Drying (μm) | Drying apparatus | Drying conditions (T° C./hours) |
|---|---|---|---|---|---|---|---|
| 1 | 63 | 0.7659 | 1.2% | 3000 | 30 | Fan assisted drier | 70° C./2 hours |
| 2 | 67 | 0.7185 | 1.1% | 3000 | 30 | Fan assisted drier | 70°C./2 hours |
| 3 | 61 | 0.7727 | 1.3% | 3000 | 30 | Fan assisted drier | 70° C./2 hours |
| 4 | 66 | 0.6967 | 1.1% | 3000 | 30 | Fan assisted drier | 70° C./2 hours |

Example 2—Reduction of Freestanding GO Film

After removal from the Teflon substrate, the freestanding GO film of Example 1 was directly reduced by flashlight. The film may optionally be cut into small pieces, e.g. to match the optimal reduction area of the flashlight equipment. The film may also optionally be cut into smaller pieces after reduction.

The flashlight reduction of the GO film of Example 1 is achieved using a pulse of a camera flash equipped with a xenon-flash bulb. The flash has a sub-millisecond duration. The flashlight is placed directly above the free-standing films in a glove box containing an $N_2$ atmosphere.

During the reduction process, the GO films absorb a flashlight pulse and generate heat which reduces the GO. It is necessary to generate high temperature to create porous structures. The porous structure is created by the gases generated during the reduction of GO, evolved due to the loss of oxygen containing functional groups (OCFGs). The high temperature allows the generation of significant amount of these gases, which expand within the film before release and create a three-dimensional porous structure (see for example, FIG. 1E).

To achieve the high temperature, the thermal management process described by equation 4, is critical for the control of temperature rise in a GO film:

$$C_p \dot{m} \frac{\partial T_{GO}}{\partial t} = E_{in} - \kappa A \frac{\Delta T_{sub}}{\Delta x} - hA(T_{sub} - T_{amb}) - \varepsilon \sigma A(T_{GO}^4 - T_{amb}^4) \qquad \text{Equation 4}$$

wherein $$C_p \dot{m} \frac{\partial T_{GO}}{\partial t}$$

represents the energy of GO film heating,
$E_{in}$ is the light energy absorbed by GO film, $$\kappa A \frac{\Delta T_{sub}}{\Delta x}$$

represents conduction loss to substrate,
$hA(T_{sub}-T_{amb})$ represents convection loss to atmosphere, and
$\varepsilon \sigma A(T_{GO}^4-T_{amb}^4)$ represents radiation loss during the reduction process.

The temperature rising from the GO film over time is affected by the incident energy dose, the conduction, convection and radiation losses, as well as the specific heat capacity $C_p$ and mass of the material $\dot{m}$. Therefore, to achieve high temperature in a short time frame, it is necessary to exert a significant amount of energy to the material rapidly. This rapid heating is achieved by the short pulse of light delivered by the flashlight.

Sources of heat loss, including conduction, convection and radiation, were minimized through application of photoirradiation in the form of a short-lived flash and applying the photoirradiation to GO that is not in contact with a substrate. The short pulse of energy reduces the convection and radiation losses and the lack of substrate minimizes conduction losses.

Example 2.1—Simulations of Flash Reduction of GO Films

To understand the impact of each term in Equation 4, we set up a numerical model of a flashlight pulse interacting with a GO film based on COMSOL Multiphysics 5.3 to simulate the heat transferring process, in which two key parameters are considered, namely the film thickness and the substrate materials. Conduction loss in Equation 4 is introduced by the thermal conduction of the substrate, especially for the substrates with good thermal conductivity such as glass or metals. Therefore, to minimize the conduction loss, it is important to remove the substrate and have a freestanding GO film. The cooling power is typically several Watt $m^{-2}$, which is negligible considering the area of the sample is around 0.001 $m^2$. The convective thermal loss can be minimized by reducing the sample in a glovebox, which provides $N_2$ atmosphere. By meeting all these conditions, the thermal management may be described by Equation 5, which is a simplified version of Equation 4:

$$C_p \dot{m} \frac{\partial T_{GO}}{\partial t} = E_{in} - \kappa A \frac{\Delta T_{sub}}{\Delta x} \qquad \text{Equation 5}$$

wherein all terms are as defined above in Equation 4.

In equation 5, only when the thickness of the freestanding GO film reaches an optimum the absorbed energy from the flashlight pulse and the heat losses can be balanced leading to a maximized peak temperature. The absorbance of the GO films with different thickness is measured by a UV-vis-NIR spectrometer within the flash spectrum range (300 nm to 1100 nm). The absorbed energy from the flash is calculated according to Equation 6:

$$E_{in} = \int p_{flash}(\lambda) \alpha_{GO}(\lambda) d\lambda \qquad \text{Equation 6}$$

wherein
$E_{in}$ represents the absorbed energy,
$p_{flash}$ represents the flash power,
$\alpha_{go}$ represents the absorption coefficient of the GO film, and
$\lambda$ represents the wavelength of the light emitted from the flashlight.

To study the effect of the substrate, we carried out simulations for silica glass, aluminium and gold substrates. In these cases, the thermally conductive substrates serve as heat sinks hence lowering the achievable peak temperature (below 500 K in all cases) following flash exposure. The limited successes of flash reduction of GO in water and on an aluminium substrate can be attributed to the lower peak temperature caused by the high heat losses to water or aluminium substrate. In addition, due to the lower peak temperature, the volume of evolved gases was calculated as being lower in these simulation, resulting in low porosity and specific capacitance of the rGO material.

Figure 2:
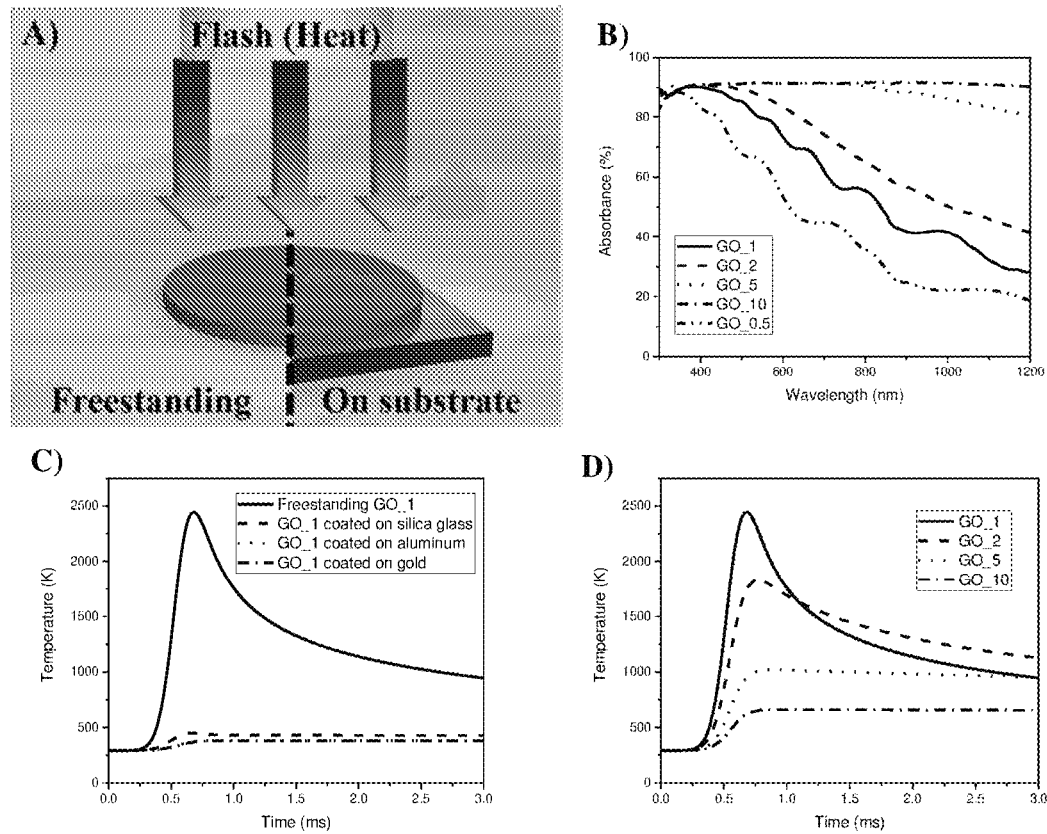
FIGS. 2A-D show (A) a schematic of the theoretical setup for simulating flash reduction of a freestanding GO film versus a GO film coated on a silica glass, aluminum or gold substrate described in Example 2; (B) absorbance spectra for GO films of the following thicknesses: 1, 2, 5 and 10 μm labeled as GO_1, GO_2, GO_5 and GO_10 respectively, output spectra of the xenon lamp used to provide the flash pulse and the recorded temperature change at the rear face of GO film (non-exposed side of the GO film; (C) a chart of calculated peak temperature achieved for a 1 μm freestanding GO film compared to 1 μm GO film coated on silica glass, aluminium or gold substrates under flashlight irradiation conditions as shown in FIG. 2A; and (D) a chart of calculated peak temperatures for freestanding GO films of different thicknesses under flashlight irradiation conditions as shown in FIG. 2A.

Equations 5 and 6 show that despite higher absorbances being achieved in thicker GO films, the peak temperature drops significantly due to the increase of mass. The peak temperature of up to 2500 K can be achieved by absorbing the flash pulse, which is higher than the damage threshold of the carbon network (2000° C.). However, although the thicker films result in lower peak temperature, the peak temperatures of above 600 K can be achieved in the free-standing GO films, which is higher than the reported temperature (200-230° C.) for the desorption of OCFGs of GO due to the good thermal insulation of the freestanding film. Therefore, the optimal thickness depends on the flash light power, which can be simulated by changing the power. The optimal peak temperature is from 2000° C. to 2500° C. One example of simulated flashlight heating process is shown in FIG. 2A, with calculated results shown in FIGS. 2B and 2C. These calculations were corroborated by the measured absorbances across GO films of different thicknesses shown in FIG. 2B.

Example 2.2

Images captured of a GO film before, during and after reduction are shown in FIG. 3. These images show that irradiation with a short pulse of light triggers evolution of gases, which have a visible impact on the morphology of the GO film and serves as an indicator for successful GO reduction.

One example of the characterization of the frGO film is shown in FIGS. 1A-E. The X-ray photoelectron spectroscopy (XPS) results shown in FIGS. 1A-C reveal the successful reduction of flash-exposed GO films. XPS parameters are set out in Table 4. Compared to the large oxygen-containing components in GO films (FIG. 1A), the XPS spectrum shown in FIG. 1B clearly demonstrates the dominant C—C sp2 bond in the frGO with only one peak at about 284.7 eV. Small traces of C—O and C═O bonds are also found in the XPS spectrum, which indicate a small amount of carboxyl and carbonyl groups in the frGO films. The percentage of C—C sp2 bond is as high as 92.38% by integrating the area of the peaks, which is comparable to the state-of-the-art microwave reduction results, such as described in D. Voiry et al., High-quality graphene via microwave reduction of solution-exfoliated graphene oxide. *Science* 353, 1413-1416 (2016). The comparable proportion of C—C sp2 bonds in the frGO suggests that high-quality graphene has been produced. Raman spectra also confirms the formation of graphene network by the strong 2D peak at about 2700 $cm^{-1}$. The Raman spectra of the samples were taken using confocal Raman spectroscopy (NT-MDT Spectrum Instruments NTEGRA SPECTRA) with a 532 nm laser excitation. As-prepared frGO films reveal high electrical conductivity as measured by a 4 point probe (135 S $m^{-1}$), which is derived from a measured sheet resistance of around 700 $\Omega sq.^{-1}$. However, compared with the Raman spectrum of the microwave reduced GO (mrGO) in FIG. 1C, which shows a very small D band peak, the frGO shows relatively high ratio of area under the curve for D-band and G-band peak (ID/IG) of 1.02 $cm^{-1}$, which is shifted slightly from 1.09 $cm^{-1}$ of GO. The decrease of ID/IG ratio in both mrGO and frGO indicates the restoring of a π-conjugated structure and removal of some sp3 bonds from oxygen functional groups, while the relatively high ID/IG ratio detected in frGO suggests the existence of higher density of defects compared to finely reduced mrGO films. These defects are derived from the partially damaged sp2 network during the rapid flash exposure and are essential to form ion pathway for electrochemical supercapacitor (ES) applications.

TABLE 4

| XPS setting parameters | |
|---|---|
| Flood gun | on |
| Spot size | 150~400 μm |
| Native Coordinates | Enable auto height |
| Survey | on |
| C's Scan | on |
| O's Scan | on |
| Energy scale | Binding |
| Start | 279.00 ev |
| End | 298.00 ev |
| Number of scans | 50 |
| Dwell time(ms) | 50 |
| Energy step size | 0.1 ev |

SEM images (FIGS. 1D-F) reveal the sponge-like porous structure of frGO films. Although the freestanding film retains its integrity and robustness after flash exposure, the layer-by-layer microstructures of GO have been converted to disordered corrugated sheets of graphene with nano- and micro-pores generated between the adjacent sheets (FIGS. 1D and 1E). Micro-cracks in the frGO planes (FIG. 1F) were also introduced by the instantaneous high pressure caused by rapid generation and release of large volume of gasses. Accordingly, an average pore size of around 12 nm was measured from Brunauer-Emmett-Teller (BET) results, which is suitable for the free passage of high voltage ionic liquid electrolyte. The porous texture of the obtained frGO was analyzed by nitrogen adsorption at 77 K in BET analysis.

Example 3—Preparation of a Graphene-Based Electrode

The rGO film can be ground with any grinder provided that the powder is not ground too fine (e.g. particles having an average size of less than several microns). In this way, the porous structure achieved by the flash reduction of GO is maintained. Poly-1,1-difluoroethene (PVDF) and carbon are added to the powdered frGO, and N-methyl pyrrolidone (NMP) is added. The amount of NMP added was about 4 mL NMP for every about 1 mg frGO.

TABLE 5

| Slurry composition | | | |
|---|---|---|---|
| Solvent | Active material | Conductive additive | Binder |
| N-methyl pyrrolidone (NMP) | frGO | Carbon | poly-1,1-difluoroethene (PVDF) |
| Ratio | 8 | 1 | 1 |

The slurry mixture is stirred using a magnetic stirring (about 200 rpm) for 20 h at room temperature (20-40° C.).

The slurry is then coated onto a current collector using the Dr. Blade method as described in Example 1 above and dried in an oven at 50° C. for 30 min. This coating process may be repeated to increase the thickness of electrodes.

The coated film is transferred to a vacuum oven to dry at 50° C. and −1 atm for 10 h to remove NMP carrier.

Example 4—Supercapacitor Comprising Electrode(s) of Example 3

Figure 4:
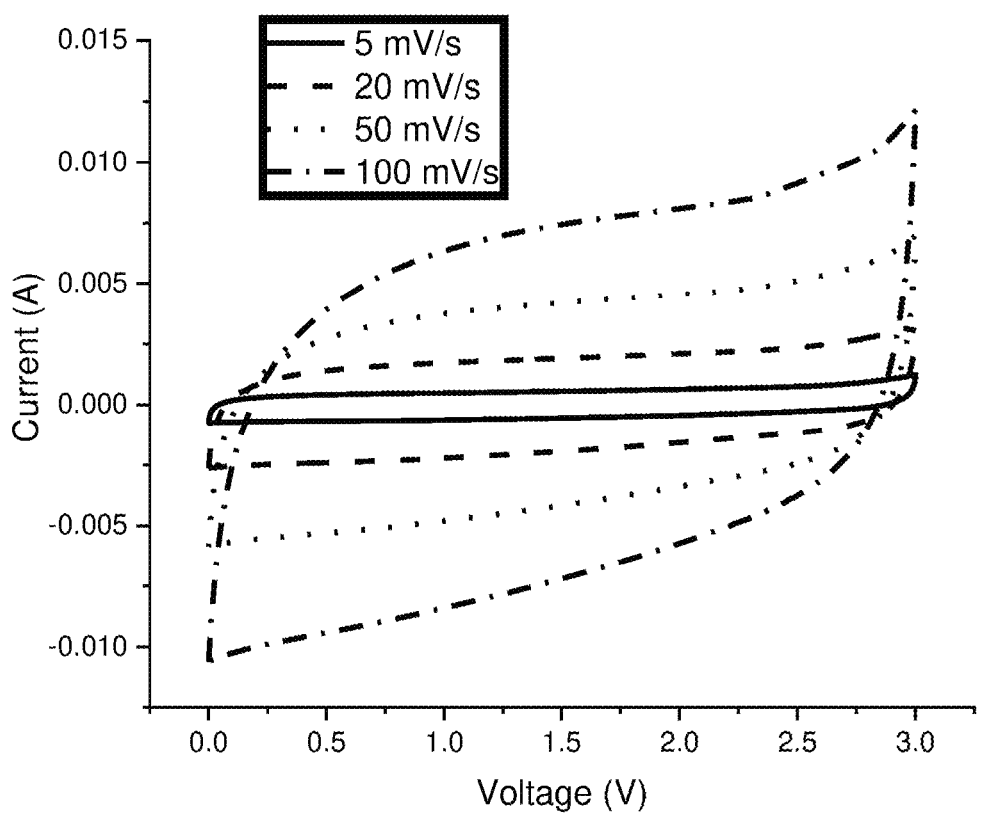
FIG. 4 shows cyclic voltammograms (CVs) obtained using the supercapacitor described in Example 4.
Figure 6:
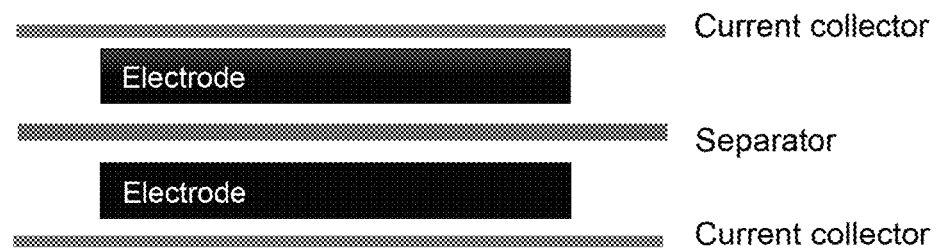
FIG. 6 shows a schematic of the supercapacitor described in Example 4.

Two electrodes of Example 3 are assembled into a supercapacitor. The supercapacitor comprised two pieces of 16 μm carbon coated aluminium current collectors and a piece of battery film (e.g. a Ceramic Coated Membrane with the dimensions 16 μm thick×60 mm W×5 mm L) as separator for a Li-ion Battery (EQ-bsf-0016-500A-s1) to form a sandwich structure. Details of each of these layers are set out in Table 6 and a schematic of the construction of this supercapacitor is shown in FIG. 6. The separator is included to ensure the two electrodes do not come into contact with each other and cause a short-circuit. In the separator described in this Example, the separator was made to be slightly larger in terms of area than the two electrodes to ensure that they did not touch; however, alternatively, the separator may be wrapped, for example in a zig-zag fashion, around one or both electrodes to achieve a similar effect. The performance was tested using a VSP-300 multichannel potentiostat. The scanning speed was varied from 5 mV/s to 100 mV/s and the voltage window tested was from 0V to 3.5 V. Cyclic voltametric (CV) curves obtained using this supercapacitor are shown in FIG. 4.

TABLE 6

Configuration of each layer of the supercapacitor of Example 4

| Name | Length (cm) | Width (cm) | Thickness (μm) | Material |
|---|---|---|---|---|
| Current collector | 6 | 4 | 16 | Carbon coated Al foil |
| Electrode | 6 | 4 | 50 | frGO |
| Separator | 7 | 5 | 16 | Ceramic Coated Membrane |

Figure 5:
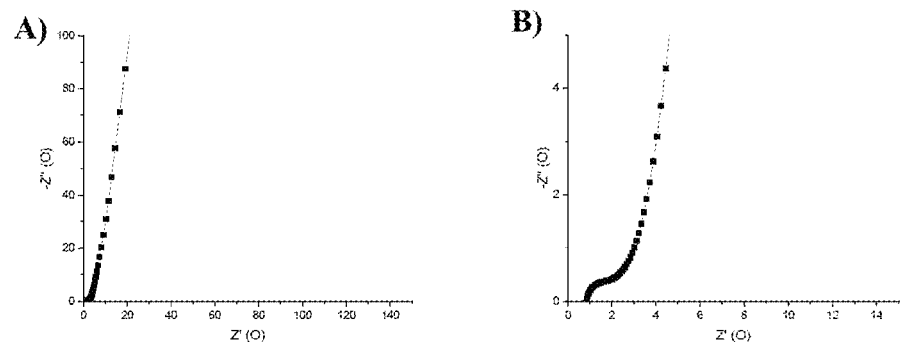
FIGS. 5A and B show an electrochemical impedance spectroscopy (EIS) curve obtained using the supercapacitor of Example 4 where (A) shows the full display region and (B) shows a reduced display region.

The electrochemical impedance spectroscopy (EIS) curve of the supercapacitor is shown in FIG. 5A, with a reduced display region of this EIS curve shown in FIG. 5B. The specific capacitance values of the supercapacitor with different scan rates are summarized in Table 7.

TABLE 7

Specific capacitance at various scan rates

| Scan rate (mV/s) | Specific capacitance (F/g) |
|---|---|
| 5 | 90 |
| 20 | 78 |
| 50 | 66 |
| 100 | 55 |

The invention claimed is:

1. A process of reducing graphene oxide, comprising rapidly heating a freestanding film comprising graphene oxide.

2. The process of claim 1, wherein in the rapid heating step, the film is heated from ambient to a peak temperature in up to about 10 ms.

3. The process of claim 1, wherein in the rapid heating step, the film is heated to a temperature of from about 250° C. to about 3000° C.

4. The process of claim 1, wherein the rapid heating is by flash light.

5. The process of claim 1, wherein the process produces reduced graphene oxide in the form of sheets that are interconnected to define pores between the sheets.

6. The process of claim 5, wherein the size of the pores is from about 0.1 nm to about 2 μm.

7. The process of claim 1, wherein the freestanding film has a thickness of at least about 15 μm.

8. The process of claim 1, wherein the freestanding film has a thickness of from about 15 μm to about 200 μm.

9. The process of claim 1, wherein the graphene oxide is heated by applying heat as a pulse, wherein the heat is applied for about 0.5 ms to about 10 ms.

10. The process of claim 1, wherein the graphene oxide is rapidly heated by a heat source selected from a flash light, a laser, a microwave emitter or a combination thereof.

11. The process of claim 1, wherein in the rapid heating step, the film is heated to a temperature of from about 600° C. to about 2500° C.

12. A process of preparing an electrode, comprising:
rapidly heating a freestanding film comprising graphene oxide to form a film comprising reduced graphene oxide;
processing the film comprising reduced graphene oxide to form a powder;
dispersing the powder in a carrier comprising an organic solvent to form a slurry;
applying the slurry to a conductive substrate to form a wet layer; and
removing carrier from the wet layer to form a dried layer.

13. The process of claim 12, wherein the organic solvent is N-methyl pyrrolidone.

14. The process of claim 12, wherein the slurry further comprises a binder.

15. The process of claim 12, wherein the dried layer has a thickness of at least 50 μm.

16. The process of claim 12, wherein the reduced graphene oxide is in the form of sheets that are interconnected to define pores between the sheets.

17. The process of claim 16, wherein the size of the pores is from about 0.1 nm to about 2 μm.

18. The process of claim 12, wherein in the rapid heating step, the film is heated from ambient to a peak temperature in up to about 10 ms.

19. The process of claim 12, wherein the freestanding film has a thickness of from about 15 μm to about 200 μm.

20. The process of claim 12, wherein the graphene oxide is rapidly heated by a heat source selected from a flash light, a laser, a microwave emitter or a combination thereof.

* * * * *